United States Patent
Vo et al.

(10) Patent No.: US 7,520,559 B2
(45) Date of Patent: Apr. 21, 2009

(54) FOAMS FOR VEHICULAR ENERGY ABSORBANCE

(75) Inventors: Chau V. Vo, Souffelweyersheim (FR); Steven B. Swartzmiller, Clarkston, MI (US); Myron J. Maurer, Lake Orion, MI (US); Marisa Calhoun, Clarkston, MI (US)

(73) Assignee: Dow Global Technologies, Inc., Midland, MI (US)

( * ) Notice: Subject to any disclaimer, the term of this patent is extended or adjusted under 35 U.S.C. 154(b) by 353 days.

(21) Appl. No.: 11/391,804

(22) Filed: Mar. 29, 2006

(65) Prior Publication Data

US 2007/0158976 A1 Jul. 12, 2007

Related U.S. Application Data

(60) Provisional application No. 60/757,582, filed on Jan. 10, 2006.

(51) Int. Cl.
*B60J 5/00* (2006.01)

(52) U.S. Cl. .............................. 296/187.01; 296/146.6; 521/134

(58) Field of Classification Search ............ 296/187.01, 296/187.03, 187.05, 187.12, 187.13, 146.6; 521/132, 134, 136, 137, 138, 908
See application file for complete search history.

(56) References Cited

U.S. PATENT DOCUMENTS

| | | |
|---|---|---|
| 2,899,708 A | 8/1959 | Donaldson et al. |
| 3,231,524 A | 1/1966 | Simpson |
| 3,334,169 A | 8/1967 | Erceg et al. |
| 3,482,006 A | 12/1969 | Carlson, Jr. |
| 3,484,510 A | 12/1969 | Corazza |
| 3,923,948 A | 12/1975 | Jackson et al. |
| 4,359,160 A | 11/1982 | Myers et al. |
| 4,420,448 A | 12/1983 | Krutchen |
| 4,485,193 A | 11/1984 | Rubens et al. |
| 4,510,268 A | 4/1985 | Tonokawa et al. |
| 4,579,774 A | 4/1986 | Kuwazuru et al. |
| 5,059,376 A | 10/1991 | Pontiff et al. |
| 5,281,632 A * | 1/1994 | Smits et al. ............... 521/132 |
| 5,340,844 A | 8/1994 | Welsh et al. |
| 5,424,016 A | 6/1995 | Kolosowski |
| 5,453,454 A | 9/1995 | Alicke et al. |
| 5,526,622 A | 6/1996 | Augustine |
| 5,585,058 A | 12/1996 | Kolosowski |
| 5,718,968 A | 2/1998 | Cutler et al. |
| 5,721,284 A * | 2/1998 | Smits et al. ............... 521/112 |
| 5,776,390 A | 7/1998 | Fiddelaers et al. |
| 6,213,540 B1 | 4/2001 | Tusim et al. |
| 6,720,362 B1 | 4/2004 | Park |
| 2004/0001945 A1 | 1/2004 | Cate et al. |

FOREIGN PATENT DOCUMENTS

GB 1099313 5/1965

\* cited by examiner

*Primary Examiner*—Lori L Lyjak (57) ABSTRACT

The invention is an energy absorbing member comprising, an amorphous thermoplastic cellular polymer in contact with a structural element, wherein at least about 50% of the cells of the amorphous cellular polymer are closed cells and the closed cells have a gas pressure that is about 0.5 atmosphere to about 1.4 atmospheres at ambient temperature.

40 Claims, 2 Drawing Sheets structural element: helmet skin, vehicular door panel, vehicular door beam, vehicular roof or dash, not shown

FOAMS FOR VEHICULAR ENERGY ABSORBANCE

CROSS-REFERENCE TO RELATED APPLICATION

This application claims the benefit of U.S. Provisional Application Ser. No. 60/757,582 filed Jan. 10, 2006 which is hereby incorporated by reference.

FIELD OF THE INVENTION

The invention relates to crash energy absorbing polymeric foams in vehicles such as automobiles.

BACKGROUND OF THE INVENTION

Polymer foams are widely used in a variety of cushioning applications. Foams are commonly used in pillows, seating, mattresses and similar applications where softness and comfort are predominating factors. Foams are also used to cushion the contents of a package. In packaging, the foam, typically, only sees moderate strains due to jostling or dropping of the package and as a result is only elastically deformed (i.e., the foam springs back after being deformed, which is typically less than about 10% strain). Packing foam also has little if any requirements related to the dimensions of the foam, but merely must cushion the contents against low impacts. Consequently, it is quite common for inexpensive expanded polystyrene and expanded cellulose based packing peanuts to be used even though each of these are susceptible to considerable deformation due to temperature and humidity respectively.

In recent years, automobiles have been required to meet ever more stringent demands for mitigating occupant injury during crashes. To do so, automobiles have incorporated air bags for frontal collisions. More recently, more and more attention has been paid to side crashes and head injuries from rollover accidents. These have employed side air bags and have also started to employ foams that absorb energy not merely by elastically deforming, but by inelastically deforming (i.e., being crushed).

The vast majority of the foams used for automobile crash mitigation have been closed cell thermoset foams such as polyurethane and closed cell crystalline thermoplastic foams such as expanded polypropylene beads and polypropylene coalesced foam strands (e.g., STRANDFOAM, trademark of The Dow Chemical Company). Each of these automobile energy absorbing foams tend to be expensive and of greater weight for the compressive energy absorbed than desired. However, because of their being, for example, crystalline or a thermoset, display excellent dimensional stability which is required by auto manufacturers to ensure proper crash absorption as well as preventing any squeaks or rattles from developing.

Other polymer foams such as polystyrene foams, which are common in packaging as described previously, have been tried, but they have not gained much if any commercial acceptance, mainly because of their lack of dimensional stability in the harsh environment an automobile presents. For example, an automobile interior can see temperatures from minus 20° C. or less in the winter, for example, in Alaska, to temperatures approaching 100° C. due to the sun in death valley (can easily cook an egg on a car roof top).

Accordingly, it would be desirable to provide a vehicular energy absorbing foam that is inexpensive, has low weight, good energy absorbance and can withstand the environment presented by an automobile interior.

SUMMARY OF THE INVENTION

One aspect of the invention is an energy absorbing member comprising, an amorphous thermoplastic cellular polymer in contact with a structural element, wherein at least about 50% of the cells of the amorphous cellular polymer are closed cells and the closed cells have a gas pressure that is about 0.5 atmosphere to about 1.4 atmospheres at ambient temperature (i.e., about 23° C.).

Surprisingly, it has been discovered that an amorphous foam when it has the aforementioned cell pressure, even though it may have a low glass transition temperature (e.g., polystyrene) can be incorporated into a vehicle structural component such as a door to form an impact absorbing member without substantially deforming (e.g., meets automotive specifications for dimensional stability).

A second aspect of the invention is a method of forming an energy absorbing member comprising, (a) mixing an amorphous thermoplastic resin and a blowing agent, (b) forming a shaped polymeric foam from the mixture of the resin and blowing agent, wherein the foam has at least about 50% closed cells, (c) treating the formed shaped foam such that the closed cells have a gas pressure of about 0.5 to about 1.4 atmospheres to form a treated formed shaped foam, and (d) attaching the treated formed shaped foam to a structural element to form the energy absorbing member.

The method may be used to form energy absorbing members in vehicles such as automobiles, buses, trucks, trains, aircraft, bike helmets, crash barriers, and any other applications where the absorbance of energy from an acute impact is desired to be mitigated.

A third aspect of the invention is an energy absorbing member comprising, an amorphous thermoplastic cellular polymer in contact with a structural element, wherein at least about 50% of the cells of the amorphous cellular polymer are closed cells and the closed cells have therein a blowing agent comprised of carbon dioxide. Surprisingly, when $CO_2$ is the primary blowing agent, it has been found that the dimensional stability, of the energy absorbing member is substantially improved compared to other blowing agents.

A fourth aspect of the inventions is an energy absorbing member comprising, an amorphous thermoplastic cellular polymer in contact with a structural element, wherein at least about 50% of the cells of the amorphous cellular polymer are closed cells and the thermoplastic cellular polymer has been perforated such that the maximum diffusion distance is at most about 60 mm. It has also surprisingly been found that the use of perforations in the foam of the energy absorbing member results in excellent dimensional stability performance.

DETAILED DESCRIPTION OF THE INVENTION

The Energy Absorbing Member

The invention is an energy absorbing member comprising, an amorphous thermoplastic cellular polymer in contact with a structural element. The structural element of the energy absorbing member is any structure that supports or acts in concert with the cellular polymer (interchangeably referred to herein as "foam") to dissipate the energy of an impact such as a vehicular accident. Examples of structural elements are vehicular door panels, beams, dashes and roofs; helmet skins; and guard rails. Preferably, the structural element is a door panel, door beam, dash or roof of an automobile or truck. It is understood that the structural member is to support and act as backing to the cellular polymer and is not meant to imply that the structural member is a component that necessarily is a structural element of a greater device (e.g., vehicle), even though it may be.

The energy absorbing member is also comprised of an amorphous thermoplastic cellular polymer. Amorphous means, as commonly understood in the art, lacking a definite crystal structure and a well defined melting point. There, however, may be some very small ordered structure, but due to the size of such order, the techniques to measure such order, for example, fail to detect or is not substantially different than an amorphous material. For example, the ordered domains may be of such a small size that X-ray diffraction results in such diffuse scattering that if such domains were present they would be of a size of at most about 50 to 100 nanometers. Even though the polymer is amorphous, a small portion may display some localized order so long as a well defined melting point is not present. Illustratively, an X-ray diffraction pattern may display small peaks discernable above the noise of the X-ray technique.

The polymer is understood to mean a synthetic organic polymer and may be any suitable thermoplastic amorphous polymer. Exemplary suitable polymers include polystyrenic and polystyrenic copolymers. Polystyrenic means a polymer that is of a styrene monomer, derivative of a styrene monomer (e.g., a substituted styrene) or combination thereof. Examples of substituted styrenes are o-methylstyrene, m-methylstyrene, p-methylstyrene, 2,4-dimethylstyrene, 2,5-dimethylstyrene, p-tert-butylstyrene, p-chlorostyrene. Preferably, the polystyrenic polymer is polystyrene.

Polystyrenic copolymer means a copolymer of a styrenic monomer (styrene and derivative of a styrene monomer) described above and a comonomer that is not a styrenic monomer. Exemplary comonomers include acrylonitrile, poly(2,6-dimethyl-1,4-phenylene ether), methyl acrylate, methacrylonitrile, maleimide, acrylic acid, methacrylic acid, maleic anhydride, itaconic anhydride or combination thereof. The comonomer is preferably acrylonitrile, maleic anhydride or combination thereof. More preferably, the comonomer is acrylonitrile.

Generally, the amount of polystyrenic monomer in the polystyrenic copolymer is at least about 50% by mole of the copolymer. Typically, the amount of comonomer is about 1% to 50% by mole of the polystyrenic copolymer. Preferably the amount of comonomer is at least about 5%, more preferably at least about 10%, even more preferably at least about 20% and most preferably at least about 25% by mole of the polystyrenic copolymer.

A preferred polystyrenic copolymer is a styrene-acrylonitrile copolymer (SAN). The SAN copolymer may have 1% to 50% by weight of acrylonitrile. Preferably, the acrylonitrile is present in an amount of at least about 5%, more preferably at least 10%, and most preferably at least about 15% to preferably at most about 40%, more preferably at most about 35% and most preferably at most about 30% by weight of the SAN copolymer.

The polymer may be of any useful weight average molecular weight (Mw). Illustratively, the Mw of a polystyrenic or polystyrenic copolymer may be from 10,000 to 1,000,000. Preferably the Mw of a polystyrenic or polystyrenic copolymer is at least about 80,000, more preferably at least about 100,000 and most preferably at least about 150,000 to preferably at most about 400,000, more preferably at most about 350,000 and most preferably at most about 300,000.

The molecular weight distribution Mw/Mn may be any suitable distribution, which will at least in part be dependent on the particular polymer used and is readily determined by one of ordinary skill in the art. Illustratively the molecular weight distribution Mw/Mn of a polystyrenic or polystyrenic copolymer is preferably at least about 1.0, more preferably at least about 1.5 and most preferably at least about 2.0 to preferably at most about 10.0, more preferably at most about 7.0 and most preferably at most about 4.0

In addition the polymer may also contain other additives so long as it remains an amorphous thermoplastic polymer. Examples of other additives include small amounts of cross-linking agents (e.g., divinyl benzene), colorants, UV-protectants, antioxidants, fillers, flame retardants, antistats, cell nucleation control agents and the like.

The polymer in the energy absorbing member is cellular. Cellular (foam) has the meaning commonly understood in the art in which a polymer has a substantially lowered apparent density comprised of cells that are closed or open. Closed cell means that the gas within that cell is isolated from another cell by the polymer walls forming the cell. Open cell means that the gas in that cell is not so restricted and is able to flow without passing through any polymer cell walls to the atmosphere.

At least about 50% of the cells of the foam are closed. It is important to have such an amount of the cells be closed, because of energy absorption and crushing behavior that these cells may contribute upon the energy absorbing member being impacted. Although closed cells may participate to a greater degree in dissipating the energy of an impact, it has been surprisingly discovered that a small amount of open cells is desirable in achieving the proper average gas pressure necessary to achieve acceptable dimensional stability required for foams used, for example, in vehicle headliners. A representative standard for this is General Motors standard GMN8351. This standard requires a foam cube 50 mm on each side to be cycled three times through the treatment shown in Table 1 while not changing in any dimension by more that 3% after the treatment.

Table 1:
   72 hours at 85° C.
   24 hours at TEMP and HUMIDITY
   8 hours at −30° C.
   40 hours at 85° C.
   24 hours at TEMP and HUMIDITY
   8 hours at −30° C. It is preferred, for the above reason, that at least about 55%, more preferably at least about 60%, even more preferably at least about 75% and most preferably at least about 90% of the cells of the foam are closed cells.

In a preferred embodiment, all of the open cells of the foam are located at a surface of the foam, in one or more walls defining holes within the foam or combination thereof. Such open cells may be formed for example by planing the surface of the foam or perforating the foam with a pin, which is described in more detail below. It is particularly desirable for the foam to have a maximum gas diffusion distance from a closed cell to the atmosphere of at most about 60 mm. Maximum gas diffusion distance is the linear distance a gas molecule or atom has to travel to reach the atmosphere surrounding the foam and includes reaching an open cell such as an open cell within a wall of a perforation in the foam. Preferably, the maximum gas diffusion distance is at most about 50 mm, more preferably at most about 30 mm, even more preferably at most about 20 mm and most preferably at most about 15 mm.

The foam in the energy absorbing member also desirably has the lowest possible density while providing sufficient energy absorption, which typically is a function of the specific impact expected. In impact-absorbing members that are intended for head injury abatement applications, such as headliner countermeasures, helmets and the like, the cellular polymer also advantageously exhibits a compressive strength, in the direction of expected impact, of at least 250 kPa, preferably of at least 290 kPa at 25% strain, up to about 700 kPa, especially up to about 600 kPa, as measured on a 25-50 mm thick sample at a strain rate of $0.08\ s^{-1}$. For these applications, the cellular polymer advantageously has a density of no greater than about 3.5 pounds/cubic foot (56 kg/m3), preferably no greater than about 2.5 pounds/cubic foot (40 kg/m3), more preferably no greater than about 2.35 pounds/cubic foot (37.6 kg/m3). Preferably, the density is at least about 1.5 pounds/cubic foot (24 kg/m3). An especially preferred density is from about 1.75 to about 2.2 pounds/cubic foot (28-35.2 kg/m3). It has been found that cellular polymers having these compressive strengths and densities tend to have particularly low HIC(d) values, measured according to FMVSS 201(U). A particularly preferred cellular polymer for use in head injury abatement applications will have, when tested as indicated above, a compressive strength at 25% strain of 290-600 kPa, a density of 1.5 to 2.2 pounds/cubic foot (24-35.2 kg/m3), and an elastic limit of from 3-10% strain.

For pelvic injury protection abatement applications, such as pelvic bolsters and the like, the cellular polymer also advantageously exhibits a compressive strength, in the direction of expected impact, of at least 250 kPa, preferably of at least 350 kPa at 25% strain, up to about 1000 kPa, especially up to about 900 kPa, measured on a 25-50 mm thick sample at a strain rate of $0.08\ s^{-1}$. For these applications, the cellular polymer advantageously has a density of no greater than 5 pounds/cubic foot (80 kg/m3) and preferably no greater than 4.5 pounds/cubic foot (72 kg/m3). Preferably, the density is at least 2.0 pound/cubic foot (32 kg/m3). An especially preferred density is from about 2.1 to about 4.0 pounds/cubic foot (34-64 kg/m3). These stiffer cellular polymers still tend to exhibit a desired nearly constant compressive stress over a wide strain range. A particularly preferred cellular polymer for use in pelvic injury protection applications will have, when tested as indicated above, a compressive strength at 25% strain of 300-900 kPa, a density of 2.1 to 4.0 pounds/cubic foot (34-64 kg/m3), and an elastic limit of from 3-10% strain.

In thoracic abatement applications, such as thorax bolsters and the like, the cellular polymer also advantageously exhibits a compressive strength, in the direction of expected impact, of at least 150 kPa, preferably of at least 200 kPa at 25% strain, up to about 700 kPa, especially up to about 500 kPa, measured on a 25-50 mm thick sample at a strain rate of $0.08\ s^{-1}$. For these applications, the cellular polymer advantageously has a density of no greater than 3.0 pounds/cubic foot (48 kg/m3), preferably no greater than 2.0 pounds/cubic foot (32 kg/m3). Preferably, the density is at least 1.25 pounds/cubic foot (20 kg/m3). An especially preferred density is from about 1.5 to about 2.0 pounds/cubic foot (24-32 kg/m3). These more flexible cellular polymers still tend to exhibit the desired nearly constant compressive stress over a wide strain range. A particularly preferred cellular polymer for use in pelvic injury protection applications will have, when tested as indicated above, a compressive strength at 25% strain of 200-500 kPa, a density of 1.5 to 2.0 pounds/cubic foot (24-32 kg/m3), and an elastic limit of from 3-10% strain.

The cellular polymer further advantageously exhibits a compressive efficiency of at least 70% and preferably at least 80% at 60% strain, of at least 60% and preferably at least 75% at 65% strain, of at least 55% and preferably at least 70% at 70% strain and/or at least 50% and preferably at least 65% at 75% strain. Compressive efficiencies of 85% or more can be obtained with the invention at 60-65% strain. Compressive efficiency is computed by compressing the foam at a strain rate of $0.08\ s^{-1}$ in the manner described before, and recording instantaneous load and crosshead displacement. Transient stress is calculated by dividing the instantaneous load by the original cross-section area of the foam specimen normal to the direction of compression. Transient strain is calculated by dividing the change in thickness by the original thickness. Compressive efficiency is then calculated using the relationship $$\text{Efficiency}(\%) = 100\% \cdot \left( \frac{\int_0^\varepsilon \sigma \cdot \partial \varepsilon}{\sigma_{\max} \cdot \varepsilon} \right)$$

where σ represents the instantaneous stress, typically in MPa, ε represents the strain and $\sigma_{max}$ represents the maximum stress achieved in the same units as the instantaneous stress.

The cells of the cellular polymer may have an average size (largest dimension) of from about 0.05 to about 5.0 mm, especially from about 0.1 to about 3.0 mm, as measured by ASTM D-3576-98. Cellular polymers having larger average cell sizes, of especially about 1.0 to about 3.0 mm or about 1.0 to about 2.0 mm in the largest dimension, are of particular interest. It has been found that cellular polymers having higher cell sizes often have better compressive efficiencies at high strain levels. The smallest cell dimension preferably is in the range of about 0.03 to about 0.75 mm.

The invention is particularly useful for thermoplastic polymers where the effective glass transition temperature of the foam is about 75° C. to about 140° C. The effective glass temperature of the foam as opposed to the glass transition temperature of the native thermoplastic polymer is the glass transition temperature of the foam in the energy absorbing member and is used to take into consideration, for example, the plasticizing effect that a blowing agent may have on the glass transition temperature of the polymer of the foam. The invention is particularly useful, because it allows foams with low glass transition temperature, which might otherwise bloat or explode upon heating to be dimensionally stable at higher temperatures. Preferably, the effective glass transition temperature is at least about 80° C., more preferably at least about 85° C., even more preferably at least about 90° C. and most preferably at least about 95° C. to preferably at most about 135° C., more preferably at most about 130° C., even more preferably at most about 125° C., and most preferably at most about 120° C.

The effective glass temperature of the foam can be determined with the method ASTM D4065-01 Dynamic Mechanical Properties Determination. The elastic and loss moduli of the foam are measured with dynamic thermomechanical analyzer instruments, such as Rheometric Scientific RDA III Dynamic Mechanical Analyzer or Rheometrix Dynamic Mechanical Thermal Analyser RSA II, made by Rheometric Scientific Inc, TA Instruments Group, New Castle, Del. These moduli are function of temperature and change rapidly at a particular temperature range. The regions of rapid moduli change are normally referred to as transition regions and the Tg is determined as per the standard.

To achieve the dimensional stability performance necessary, it is critical that the average gas pressure of the closed cells is about 0.5 to about 1.4 atmosphere. When such a gas pressure is present in the foams of the energy absorbing member, it has been found that the largest linear dimensional change is generally less than about 5% making them useful for energy absorbing members. It is understood that the aforementioned gas pressure is the gas pressure as measured by the method described below, which is taken to represent the average pressure of closed cells at ambient conditions. The most desirable average gas pressure of the cells is dependent on many factors such as the particular polymer, foam structure, blowing agent, effective glass transition temperature and may be readily determined by one of ordinary skill in the art without undue experimentation for a given foam. Nevertheless it is desirable that the gas pressure of the cells is less than atmospheric pressure to minimize the potential for bloating of the foam, which would result in impingement on other structures in a vehicle causing, for example, squeaking or dislodging of the foam from the structural member. Preferably, the average gas pressure of the cells is less than 1.2 more preferably less than about 1.1 atmosphere, even more preferably the pressure is at most about 1.0 atmosphere, even more preferably at most about 0.99, and most preferably at most about 0.95 atmosphere.

Likewise, the average gas pressure is preferably at least about 0.55 atmosphere, more preferably at least 0.6 atmosphere and most preferably at least about 0.7 atmosphere to guard against, for example, too much contraction during a sunny day in a vehicle. The average gas pressure of the closed cells may be, using gas diffusion rates, calculated by estimating the gas content in a cellular material at differing times if the initial time that the foam is made is known (e.g., ASTM D7132-05). However, because the initial time of the foam is not always known, the following empirical method is used herein. To determine the average internal gas pressure of the closed cells of a foam of the energy absorbing member, at least 3 cubes of the foam with sides of approximately 50 mm in length are individually placed in a furnace at 85° C. under vacuum (1 Torr or less), 0.5 atmospheres and at ambient (1 atm) pressure for 12 hours. The pressure is established as quickly as possible after the cube is placed in the furnace. After the 12 hours, the furnace is allowed to cool to room temperature without changing the pressure in the furnace. After the cube is cool, it is removed and the maximum dimensional change in each orthogonal direction of the cubes is determined. The maximum linear dimensional change is then determined from the measurements and plotted against the pressure and curved fit with a straight line using linear regression analysis with the average internal cell pressure being the pressure where the fitted line has zero dimensional change (see FIG. 2).

The foam of the energy absorbing member, invariably is formed using a physical or chemical blowing agent and as such typically has some residue of the blowing agent in the cells or that is solubilized within the polymer itself. The foam may have any suitable blowing agent such as a volatile aliphatic or cyclic hydrocarbon, chlorinated hydrocarbon, fluorinated hydrocarbon, chlorofluorinated hydrocarbon, alcohol, ketone, ether, gas present in the atmosphere (oxygen, nitrogen, carbon dioxide, hydrogen, helium and the like) or combination thereof.

Examples of a volatile hydrocarbon include ethane, ethylene, propane, propylene, butane, butylenes, isobutene, pentane, cyclopentane, isopentane, hexane, heptane, or mixture thereof. Examples of chlorinated hydrocarbons, fluorinated hydrocarbons and chlorofluorinated hydrocarbons include methyl chloride, Dichlorodifluoromethane, Octafluorocyclobutane, Chlorodifluoromethane, 1,2-Dichlorotetrafluoroethane, 1,1-Dichlorotetrafluoroethane, Pentafluoroethane, 2-Chloro-1,1-difluoroethane, 2-Chloro-1,1,1-trifluoroethane, 1,1,1,2-Tetrafluoroethane, 1,1,1-Trifluoroethane, 1,1,1-Trifluoropropane, Trichlorotrifluoroethane, Difluoromethane, 2-Chloro-1,1,1,2-tetrafluoroethane, 2,2-Difluoropropane, ethyl fluoride, 1,1-difluoroethane 1,1,2,2-tetrafluoroethane, pentafluoroethane, perfluoroethane, 2,2-difluoropropane, 1,1,1-trifluoropropane, and 1,1,1,2,3,3,3-heptafluoropropane, 1,1,1,3,3-pentafluoropropane, and 1,1,1,3,3-pentafluorobutane, Ethyl chloride or a mixture thereof.

Examples of aliphatic alcohols having from one to five carbons (C1-C5) include methanol, ethanol, n-propanol, iso-propanol or a mixture of thereof; Examples of carbonyl containing compounds include acetone, 2-butanone, acetaldehyde or a mixture of thereof; Examples of ether containing compounds include dimethyl ether, diethyl ether, methyl ethyl ether or a mixture of thereof. Examples of other suitable chemical blowing agents include azodicarbonamide, azodiisobutyronitrile, benzenesulfohydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

Illustratively, polystyrenic and polystyrenic copolymers typically have employed chlorofluoro hydrocarbons as the gas blowing agent. These tend to plasticize the polymer resulting in a lower effective is glass transition temperature, which may cause the inability of the foam to be dimensionally stable. These also have tended, because of their slow diffusion rate, to form foams where the average gas pressure is greater than 1 atmosphere even after the foam has been aged for a long period of time. Consequently, it is preferred that at least one blowing agent or one component of the mixture of blowing agents has a substantially faster diffusion rate through the foam than air to facilitate the formation of a foam having the aforementioned average gas pressure. Substantially faster in this context means that the diffusion rate of the blowing agent is at least about 2 times faster than the diffusion rate of air. Diffusion of air is taken as the average diffusion rate of oxygen and nitrogen weighted by the presence of each in air. Preferably, the diffusion rate of the blowing agent is at least about 3 times, more preferably at least 4 times, even more preferably at least 5 times and most preferably at least 10 times faster than the diffusion rate of air.

Because, for example, of environmental concerns, a particularly desirable embodiment of the invention is when the amorphous thermoplastic polymer is the polystyrenic or polystyrenic copolymer and the blowing agent is comprised of carbon dioxide, water or combination thereof. Preferably for this embodiment, the blowing agent is carbon dioxide.

Forming the Energy Absorbing Member

The energy absorbing member may be made as follows. The amorphous thermoplastic polymer and a blowing agent are mixed together. Any suitable method of mixing the polymer and blowing agent may be used such as those known in the art. For example, the blowing agent may be injected into polymer that has been heated within an extruder such as described in U.S. Pat. Nos. 3,231,524; 3,482,006, 4,420,448 and 5,340,844 or the blowing agent may be added to polymer beads, typically under pressure, as described by U.S. Pat. No. 4,485,193 and each of the U.S. patents this patent cites at col. 3, lines 6-13.

After the polymer and the blowing agent are mixed, the polymer and blowing agent are formed into a shape, which may be a final shape or an interim shape and may be done by any suitable method such as those known in the art (e.g., extruded expanded planks and expanded bead foam). For example, when using extrusion, a plank of foam may be formed, which is later wire cut into a more complex final shape or the board may be cut into useful shapes that are then thermoformed into a more desired final shape. The use of thermoforming may also be advantageous in that it may create a more impervious skin helping to maintain the desired gas pressures of this invention's energy absorbing member.

Such thermoforming, which is well known in the art and is described, for example, by U.S. Pat. Nos. 2,899,708; 3,334, 169; 3,484,510; 3,923,948 and 4,359,160, may be done at anytime after forming a shaped foam, but is preferably done after the shaped foam has realized a particular gas pressure (i.e., after treatment). The average gas pressure of the closed cells during thermoforming may be any described previously, but advantageously is a lower pressure, because of the compaction of the foam during thermoforming, which can raise the pressure. Illustratively, the gas pressure of the foam is at most about 1 atmosphere, preferably at most about 0.95 atmosphere 0.9, more preferably at most about 0.85 and most preferably at most about 0.8 to at least about 0.5.

To reiterate, the shaped foam is treated to realize the aforementioned average closed cell gas pressure of the foam of the energy absorbing member. The treating may be for any length of aging time sufficient to render the foam with the proper average gas pressure. The amount of time that is sufficient is dependent on many factors such as the polymer of the foam, size of the part, blowing agent used and the aging atmosphere. One of ordinary skill in the art may determine an adequate time without undue experimentation. Typically, the time may range from 1 day to 1 year or more.

In a preferred method, an extruded foam plank is formed, which is then planed to create open cells at the surface of the extruded foam plank and/or perforated to create a foam having the gas diffusion distance described herein. It is preferred that at least both the top and bottom of a foam plank is planed (i.e., the large surfaces of a plank, or for example, the 4'×8' surfaces of a 4'×8'×1' plank). This has surprisingly been found to allow for an order of magnitude reduction in treatment time under ambient conditions, particularly when the blowing agent was comprised of carbon dioxide or carbon dioxide and water. When perforating the plank, the perforations may extend through the depth of the plank or form blind holes. The perforations may be made in a like manner as described by U.S. Pat. No. 5,424,016 used to release entrapped flammable hydrocarbon gases (e.g., isobutane and pentane) from foam planks.

In addition, if desired, the treatment may include a temperature above ambient, but below a temperature where the foam might distort, which is readily determinable depending on the particular polymer used. The treatment may also include the use of differing atmospheres, for example the atmosphere may be dried air when water is used as a blowing agent. The pressure of the atmosphere surrounding the shaped foam may also be below atmosphere (vacuum) or at an elevated pressure so long as the vacuum or elevated pressure is not so great that the foam distorts. Preferably, for convenience sake, the pressure is ambient pressure and the atmosphere is air.

The treated shaped foam may also have a decorative lining or impervious membrane attached to a portion of the surface or the entire surface of the foam. The impervious membrane may be of any material that limits or ceases the migration of gases into or out of the foam. Such films may be applied by any suitable method such as those known in the art (e.g., sputtering, chemical vapor deposition, adhering foils, films or sheets using an adhesive or thermally fusing). Examples of impervious membranes include metallic foils (e.g., silver, aluminum, ferrous based foils such as steel foils) and plastic films such as polyethylene terephthalate (PET) film, Polyamide films or combinations thereof.

Finally, to make the energy absorbing member, the treated shaped foam is attached to the structural member. The treated shaped foam may be directly foamed, for example, into a cavity in the structural member when using, for example, an expandable bead foam in a helmet skin or in a door panel. The cavity may be designed into the structural element to facilitate attachment of the foam. The foam may also be attached to the structural element by any suitable method such as those known in the art including, for example, mechanically (e.g., fasteners) or chemically (e.g., adhesives and heating the structural member to a temperature sufficiently such that the foam fuses to the structural member when the foam is brought into contact with the structural element and fusing by applying a solvent to a surface of the foam and contacting it to the structural member).

ILLUSTRATIONS

Illustration 1

A 100 mm×600 mm×1200 mm (Thickness×Width× Length) plank of FLOORMATE™ 200-A (extruded polystyrene foam available from The Dow Chemical Company, Midland, Mich.) was stored for about a year under ambient conditions after being produced. The foam had a density of about 35 $Kg/m^3$ and the foam was a closed cell foam, which in practice generally means that at least 90% of the cells are closed. The blowing agent was carbon dioxide, n-pentane and isopentane. A 50 mm cube was then cut from a cross-section of the plank with a band saw. After the dimensions of the cube were measured with a caliper, the sample was placed in a convection oven for twenty-four hours at 85° C. The cube after cooling was measured and the percent change in each dimension determined as shown in Table 1. The gas pressure of the closed cells was measured as described herein and is shown in Table 1.

Illustration 2

Figure 1:
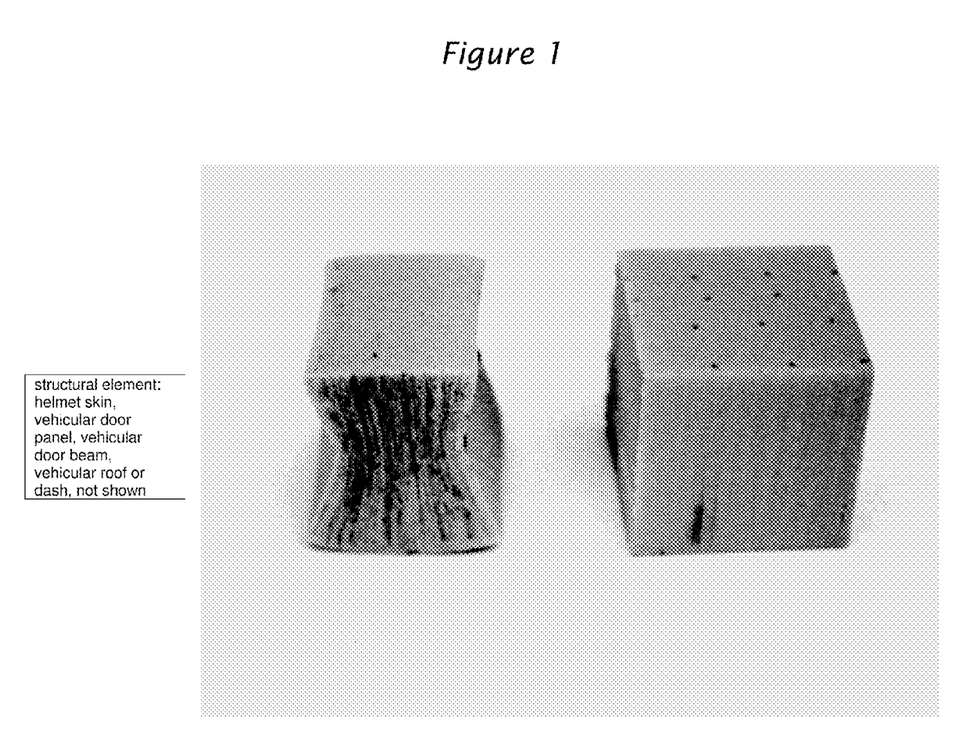
FIG. 1 is a photograph of a polystyrene foam block that has been perforated (right block) compared to a block made from the same expanded polystyrene plank, but without perforation (left block), the left block not having the internal cell pressure necessary for this invention's energy absorbing member.

A 100 mm×600 mm×2200 mm (Thickness×Width× Length) plank of extruded polystyrene foam was produced on production scale equipment using $CO_2$ as the blowing agent in a like manner as described by comparative example 1 of U.S. Pat. No. 5,340,844. The foam had a density of about 35 $Kg/m^3$ and at least 90% of the cells were closed cells. After being extruded, the plank was perforated using 2 millimeter diameter needles through the thickness of the plank. The spacing of the perforations were about 10 millimeters in the width direction and 20 millimeters in the length direction. The plank was stored for about 19 days prior to perforation and 13 days under ambient conditions after perforation. A 50 mm cube was then cut from a cross-section of the plank, measured and tested in the same manner as illustration 1 with the results shown in Table 1. The cube, after being heated to 85° C. for 24 hours, is shown in FIG. 1 on the right of the photo compared against the cube of comparative illustration 1, which is on the left of the photo.

Illustration 3

A 200 mm×600 mm×2500 mm (Thickness×Width× Length) plank of STYROFOAM™ FB-X (extruded polystyrene foam available from The Dow Chemical Company, Midland, Mich.) was stored for about 8 months under ambient conditions after being produced. The foam was produced using HFC 134a blowing agent. The foam had a density of about 36.5 Kg/m$^3$ and is a closed cell foam. A 50 mm cube was then cut from a cross-section of the plank, measured and tested in the same manner as illustration 1 with the results shown in Table 1.

Illustration 4

A 50 mm×600 mm×2200 mm (Thickness×Width×Length) plank of extruded polystyrene was produced on production scale equipment using $CO_2$ as the blowing agent in a like manner as described by comparative example 1 of U.S. Pat. No. 5,340,844 but at a slightly elevated die temperature to get the increased open cells of this foam. The foam had a density of about 35.5 Kg/m$^3$ and about 50% open cells. The plank was stored for 40 days under ambient conditions. A 50 mm cube was then cut from a cross-section of the plank, measured and tested in the same manner as illustration 1, except that the time at temperature was 13 days, with the results shown in Table 1.

Illustration 5

A 89 mm×356 mm×610 mm (Thickness×Width×Length) section of the plank of STYROFOAM* art board plank (extruded polystyrene foam available from The Dow Chemical Company, Midland, Mich., *Trademark of The Dow Chemical Company) was perforated as described in illustration 2 except that the spacing of the perforations in the width direction was about 15 mm. This foam was made using HCFC-142b blowing agent. The foam had a density of about 31.2 kg/m$^3$ and is a closed cell foam. After perforation, the plank was stored under ambient conditions for about 138 days. A 50 mm cube was then cut from a cross-section of the plank, measured and tested in the same manner as illustration 1 with the results shown in Table 1. Even though this foam did not have a particularly low cell pressure, it had acceptable dimensional stability, which has been attributed at least in part to the perforation of the foam and the aging time after perforation of the foam creating a flat line in a like manner as shown for illustration 2 in FIG. 2.

Comparative Illustration 1

A 100 mm×600 mm×2200 mm (Thickness×Width×Length) plank of extruded polystyrene was produced in the same manner as illustration 2 except that the plank was not perforated and was stored under ambient conditions for about 31 days. A 50 mm cube was then cut from a cross-section of the plank, measured and tested in the same manner as illustration 1 with the results shown in Table 1. The cube, after being heated to 85° C. for 24 hours, is shown in FIG. 1 on the left of the photo compared against the cube of illustration 2, which is on the right of the photo.

From this comparison it evident that the use of perforation is advantageous in realizing the necessary internal cell pressure for this invention.

Comparative Illustration 2

A piece of FOAMULAR™ 600 having dimensions of 38 mm×38 mm×37 mm (extruded polystyrene foam available from Owens Corning, Toledo, Ohio), was purchased and stored for about 441 days under ambient conditions. The blowing agent was HCFC-142b. The foam had a density of about 37 Kg/m$^3$ and it is closed cell foam. This cube was then measured and tested in the same manner as illustration 1 with the results shown in Table 1.

Comparative Illustration 3

A 75 mm×1219 mm×2438 mm (Thickness×Width×Length) plank of STYROFOAM FREEZERMATE™ (extruded polystyrene foam available from The Dow Chemical Company) was produced and stored for about 398 days under ambient conditions after being produced. The blowing agent was HCFC-142b. The foam had a density of about 30.2 Kg/m3 and it is a closed cell foam. A 50 mm cube was then cut from a cross-section of the plank, measured and tested in the same manner as illustration 1 with the results shown in Table 1.

Comparative Illustration 4

A 89 mm×1219 mm×2438 mm (Thickness×Width×Length) plank of STYROFOAM* art board plank (extruded polystyrene foam available from The Dow Chemical Company, Midland, Mich., *Trademark of The Dow Chemical Company) was produced and stored for at least about 138 days under ambient conditions after being produced, which was the same as the total time Illustration 5 was stored. The blowing agent was HCFC-142b. The foam had a density of about 32.2 kg/m3 pounds per cubic foot (pcf) and about 90% of cells were closed cells. A 50 mm cube was then cut from a cross-section of the plank, measured and tested in the same manner as illustration 1 with the results shown in Table 1.

Figure 2:
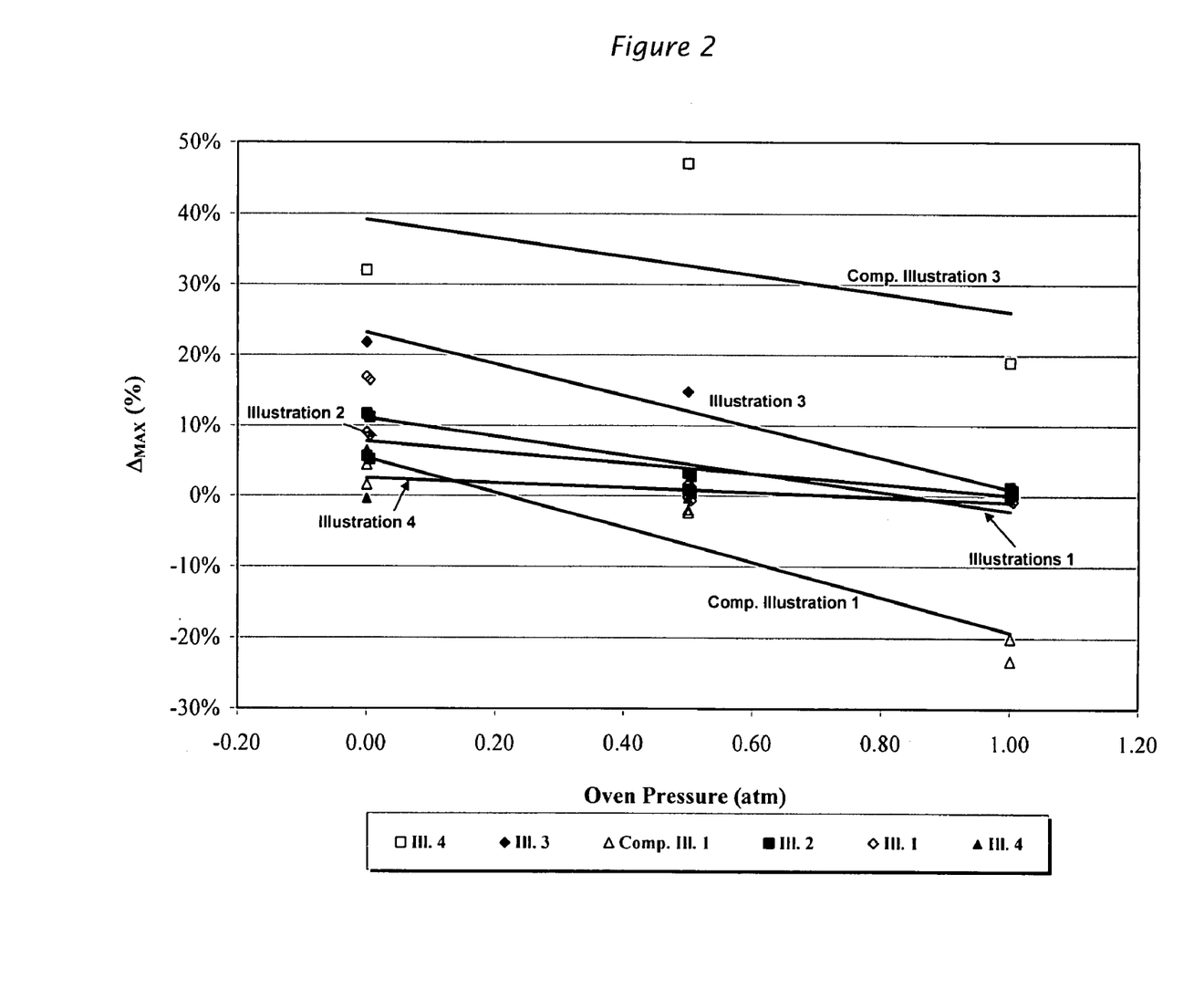
FIG. 2 is a plot of the maximum linear dimension change versus pressure of foams heated to 85° C. under differing

From the data, it is advantageous to use carbon dioxide with or without a co-blowing agent in making a foam for the invention, because of the much shortened aging times necessary to realize the internal cell pressure necessary for the invention. Surprisingly, the use of a $CO_2$ blowing agent from the plot shown in FIG. 2 (illustrations 1 and 3) also displays a decreased slope of dimensional change with pressure, thus making it less likely to deform excessively at pressures likely to be experienced in use. Likewise, the data show that the use of perforation also aids in achieving the necessary cell pressure (see, illustration 2 and comparative illustration 1) and decreases the slope of the dimensional change with pressure (see FIG. 2). Finally, a foam with substantial open cells displays the flattest slope (FIG. 2, Ill. 4).

TABLE 1

Illustration and Comparative Illustration Dimensional Stability.

| Illustration | Blowing Agent(s) | Cell Pressure (atm)* | Before Dimensions | | | After Dimensions | | | Dimensional Stability | | | |
| --- | --- | --- | --- | --- | --- | --- | --- | --- | --- | --- | --- | --- |
| | | | $L_i$ (mm) | $W_i$ (mm) | $T_i$ (mm) | $L_f$ (mm) | $W_f$ (mm) | $T_f$ (mm) | ΔL (%) | ΔW (%) | ΔT (%) | ΔV (%) |
| 1 | $CO_2$/isopentane | 0.85 | 48.93 | 50.28 | 51.19 | 47.74 | 49.50 | 50.68 | −2.4 | −1.6 | −1.0 | −4.9 |
| 2 | $CO_2$ | 1.00 | 50.31 | 48.76 | 49.09 | 50.83 | 48.55 | 48.92 | 1.0 | −0.4 | −0.4 | 0.2 |
| 3 | HFC 134a | 1.05 | 50.74 | 50.77 | 50.70 | 52.93 | 52.40 | 53.21 | 4.3 | 3.2 | 5.0 | 13.0 |
| 4 | $CO_2$ | 0.74 | 49.67 | 49.81 | 49.28 | 49.85 | 49.10 | 48.43 | 0.4 | −1.4 | −1.72 | −2.77 |
| 5 | HCFC-142b | 1.35 | 50.19 | 48.50 | 48.59 | 55.69 | 48.56 | 48.59 | 10.9 | 0.12 | 0.00 | 11.1 |
| Comp. 1 | $CO_2$ | 0.25 | 51.25 | 51.54 | 47.42 | 22.79 | 45.24 | 46.37 | −56 | −12.2 | −2.2 | −61.8 |
| Comp. 2 | HCFC-142b | ND | 36.80 | 38.03 | 37.68 | 36.75 | 39.30 | 42.41 | −0.1 | 3.3 | 12.6 | 16.2 |

TABLE 1-continued

Illustration and Comparative Illustration Dimensional Stability.

| Illustration | Blowing Agent(s) | Cell Pressure (atm)* | Before Dimensions | | | After Dimensions | | | Dimensional Stability | | | |
|---|---|---|---|---|---|---|---|---|---|---|---|---|
| | | | $L_i$ (mm) | $W_i$ (mm) | $T_i$ (mm) | $L_f$ (mm) | $W_f$ (mm) | $T_f$ (mm) | $\Delta L$ (%) | $\Delta W$ (%) | $\Delta T$ (%) | $\Delta V$ (%) |
| Comp. 3 | HCFC-142b | >1.5 | 51.37 | 52.05 | 50.30 | 56.03 | 52.02 | 63.18 | 9.1 | −0.1 | 25.6 | 36.9 |
| Comp. 4 | HCFC-142b | 2.1 | 50.23 | 53.80 | 50.24 | 65.77 | 54.23 | 56.14 | 30.9 | 0.8 | 11.7 | 47.5 |

*cell pressure was measured as described herein.
ND—Not determined

What is claimed is:

1. An energy absorbing member comprising, an amorphous thermoplastic cellular polymer in contact with a structural element, wherein at least about 50% of the cells of the amorphous cellular polymer are closed cells and the closed cells have an average gas pressure that is about 0.5 atmosphere to about 1.4 atmospheres at ambient temperature.

2. The energy absorbing member of claim 1, wherein the structural element is a helmet skin, vehicular door panel, vehicular door beam, vehicular roof or vehicular dash.

3. The energy absorbing member of claim 2, wherein the structural element is a vehicular door panel, vehicular door beam or vehicular roof.

4. The energy absorbing member of claim 1, wherein the amorphous thermoplastic cellular polymer is a polystyrenic polymer or polystyrenic copolymer.

5. The energy absorbing member of claim 4, wherein the amorphous thermoplastic cellular polymer is the polystyrenic polymer.

6. The energy absorbing member of claim 5, wherein the polystyrenic polymer is polystyrene.

7. The energy absorbing member of claim 4, wherein the amorphous thermoplastic cellular polymer is the polystyrenic copolymer.

8. The energy absorbing member of claim 7, wherein the polystyrenic copolymer is a copolymer of styrenic monomer and a comonomer selected from the group consisting of acrylonitrile, poly(2,6-dimethyl-1,4-phenylene ether), methyl acrylate, methacrylonitrile, maleimide, acrylic acid, methacrylic acid, maleic anhydride, itaconic anhydride and combination thereof.

9. The energy absorbing member of claim 8, wherein the comonomer is acrylonitrile.

10. The energy absorbing member of claim 9, wherein the acrylonitrile is present in amount of about 1% to about 35% by weight of the amorphous thermoplastic cellular polymer.

11. The energy absorbing member of claim 10, wherein the acrylonitrile is present in an amount of at most about 15%.

12. The energy absorbing member of claim 11, wherein the acrylonitrile is present in an amount of at most about 20%.

13. The energy absorbing member of claim 1, wherein the amorphous thermoplastic cellular polymer contains a residue of a blowing agent.

14. The energy absorbing member of claim 13, wherein the blowing agent comprises a volatile aliphatic or cyclic hydrocarbon, alcohol, ketone, ether, carbon dioxide, water or combination thereof.

15. The energy absorbing member of claim 14, wherein the blowing agent comprises ethane, ethylene, propane, propylene, butane, isobutane, butylenes, isobutene, pentane, isopentane, cyclopentane, hexane, heptane, ethanol, propanol, isopropanol, butanol, acetone, dimethyl ether, carbon dioxide, water or combination thereof.

16. The energy absorbing member of claim 13, wherein the blowing agent is comprised of carbon dioxide, water or combination thereof.

17. The energy absorbing member of claim 14, wherein at least one blowing agent has a diffusion rate through the cellular amorphous thermoplastic polymer that is greater than the diffusion rate of air through said polymer.

18. The energy absorbing member of claim 17, wherein all of the blowing agents have a diffusion rate through the cellular amorphous thermoplastic polymer that is greater than the diffusion rate of air through said polymer.

19. The energy absorbing member of claim 13, wherein the blowing agent is carbon dioxide, water or combination thereof.

20. The energy absorbing member of claim 1, wherein the amorphous thermoplastic cellular polymer has an effective glass transition temperature of about 85° C. to about 135° C.

21. The energy absorbing member of claim 20, wherein the amorphous thermoplastic cellular polymer has an effective glass transition temperature of about 90° C. to about 125° C.

22. The energy absorbing member of claim 21, wherein the amorphous thermoplastic cellular polymer has and effective glass transition temperature of at most about 120° C.

23. The energy absorbing member of claim 1, wherein at least about 70% of the cells of the amorphous cellular polymer are closed cells.

24. The energy absorbing member of claim 23, wherein at least about 90% of the cells of the amorphous cellular polymer are closed cells.

25. The energy absorbing member of claim 1, wherein the maximum diffusion distance of the closed cells to the atmosphere surrounding the amorphous thermoplastic cellular polymer is at most about 20 millimeters.

26. The energy absorbing member of claim 25, wherein the maximum diffusion distance is at most about 10 millimeters 27. The energy absorbing member of claim 1, wherein the average gas pressure of the closed cells is less than 1.2 atmospheres.

28. The energy absorbing member of claim 27, wherein the average gas pressure of the closed cells is at least about 0.6 atmosphere.

29. The energy absorbing member of claim 28, wherein the average gas pressure of the closed cells is at least about 0.7 atmosphere.

30. The energy absorbing member of claim 29, wherein the average gas pressure of the closed cells is at least about 0.75 atmosphere.

31. The energy absorbing member of claim 30, wherein the average gas pressure of the closed cells is at most 0.99 atmosphere.

32. The energy absorbing member of claim 31, wherein the average gas pressure of the closed cells is at most 0.95 atmosphere 33. An energy absorbing member comprising, an amorphous thermoplastic cellular polymer in contact with a structural element, wherein at least about 50% of the cells of the amorphous cellular polymer are closed cells and the closed cells have therein a blowing agent comprised of carbon dioxide.

34. The energy absorbing member of claim 33, wherein the amorphous thermoplastic cellular polymer is perforated.

35. An energy absorbing member comprising, an amorphous thermoplastic cellular polymer in contact with a structural element, wherein at least about 50% of the cells of the amorphous cellular polymer are closed cells and the thermoplastic cellular polymer has been perforated such that the maximum diffusion distance is at most about 60 mm.

36. The energy absorbing member of claim 35, wherein the maximum diffusion distance is at most about 30 mm.

37. The energy absorbing member of claim 35, wherein the closed cells have therein a blowing agent comprised of carbon dioxide.

38. A vehicle having the energy absorbing member of claim 1.

39. A vehicle having the energy absorbing member of claim 33.

40. A vehicle having the energy absorbing member of claim 35

* * * * *